Jan. 28, 1930.                W. R. SMYTHE                1,744,990
                         HIGH VOLTAGE VOLTMETER
                           Filed Jan. 19, 1925
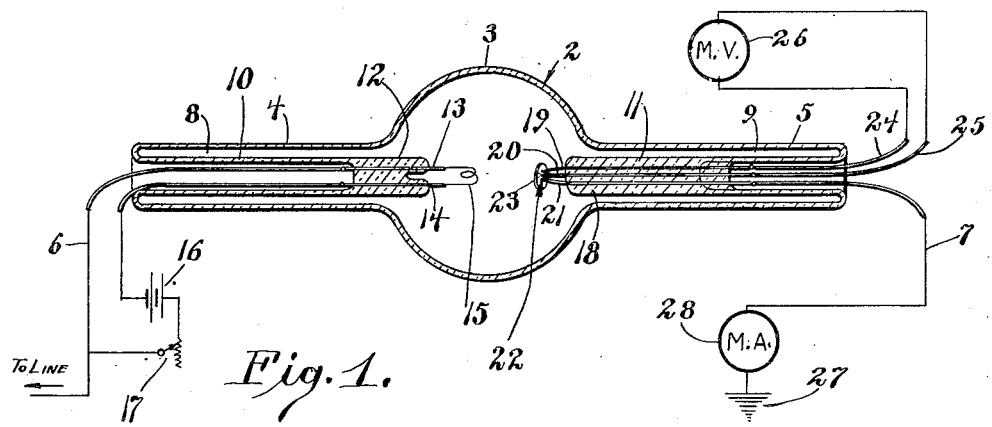
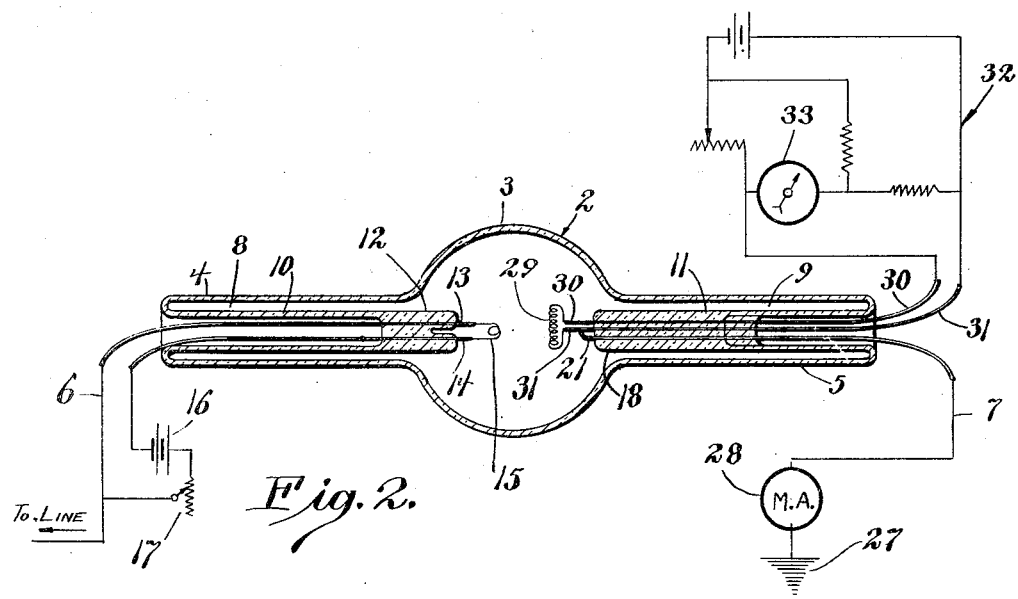
Inventor
William R. Smythe.
By Lyon & Lyon
Attorneys Patented Jan. 28, 1930

1,744,990

UNITED STATES PATENT OFFICE

WILLIAM R. SMYTHE, OF PASADENA, CALIFORNIA, ASSIGNOR TO CALIFORNIA INSTITUTE OF TECHNOLOGY

HIGH-VOLTAGE VOLTMETER

Application filed January 19, 1925. Serial No. 3,341.

This invention relates to an instrument for measuring electrical differences of potential between two different points across which there exists a high voltage drop.

At the present time when it is desired to measure a voltage above, say, 3000 volts there exists no known instrument by which the voltage may be accurately determined. Voltages around 1,000,000 volts at the present time can only be measured to an accuracy of about 10%. Moreover, devices generally used for measuring such voltages introduce capacity and inductance into the electrical circuit.

It is an object of the present invention to provide a volt-meter for such high voltage use by which the voltage can be measured with marked increased accuracy and which voltmeter will be relatively simple in operation, low in cost, and can be placed across points of different potential without the introduction of capacity or inductance into the circuit.

I have discovered that by measuring the energy of impact of electrons liberated from a heated filament in an evacuated vessel, the voltage through which these electrons have fallen can be directly determined with an accuracy within one-half percent and without the introduction of capacity or inductance into the circuit.

The invention will be more fully understood, together with various additional objects and advantages thereof, from a description of a preferred embodiment of the invention for which purpose reference is made to the following detailed description of the accompanying drawings which illustrate the preferred examples of the invention.

In the drawings:

Figure 1 is a somewhat diagrammatic view, partially in longitudinal section, of one of the embodiments of the invention.

Fig. 2 is a similar vew of another embodiment.

Referring to the drawings, the apparatus comprises an evacuated container 2 which may be of any suitable material, such as glass, and is preferably provided with an enlarged or ball shape central part 3 and with opposite extensions 4 and 5. These extensions serve as insulations for leads 6 and 7 leading to high and low potential zones across which the voltage is to be measured, it being necessary when measuring extremely high voltages to extend the extensions sufficient distance so that there is no danger of arcing across the outside ends of the leads 6, 7. The extensions 4 and 5 form annular chambers 8 and 9, respectively, which, as later pointed out, are evacuated so as to form an exceptionally efficient insulation around the leads. In construction of these annular chambers the outer walls of the extensions 4 and 5 may be turned in at the ends to provide tubular cores 10 and 11 so that in addition to the extensions forming annular chambers there is provided an axial opening therein extending near to the ball portion 3 of the vessel. Here the core 10 is thickened as indicated at 12 and sealed to lead wires 13 and 14 of a filament 15 extended within the ball shape portion 3 of the vessel. This filament may be made of any preferred or customary construction, tungsten wire being suitable, and the lead 13 is indicated as connected with the high voltage line 6, the voltage of which is to be measured. The other lead 14 from the filament passes through suitable means 16 such as a battery by which the filament may be heated, the lead 14 being further connected through a variable resistance 17 to the line 6.

The core 11 is likewise thickened as indicated at its end and thereto is sealed three wires, 19, 20 and 21, respectively, leading to within the ball part 3 of the vessel where they are joined together as at 22, preferably a disc target 23 likewise being secured to the wires 19, 20 and 21, at the point 22.

In the form of the invention shown in Fig. 1, the wires 19, 21 and target 23 are formed of one kind of metal, such as tungsten and the wire 20 is formed of a different metal, such as constantan. The wires 19 and 20 are connected beyond the thickened end 18 of the core by tungsten lines 24, 25, respectively, to a milli-voltmeter 26, the wire 21 being connected to the line 7 which is the low potential line indicated as grounded at 27 through a milliammeter.

The method of use and manner of operation of the instrument, may now be described, it being understood that upon sealing the filaments and target and wires described into the vessel, the same is then completely evacuated, such evacuation being preferably as complete as possible to obtain, the evacuation required, being within the neighborhood approximately of $10^{-6}$ centimeters, can be obtained by exhausting the vessel by means of a mercury vacuum pump. When it is desired to measure the voltage across the high and low junction leads 6 and 7, the filament 15 is lit by regulation of rheostat 17. If there exists sufficient voltage across leads 6 and 7, a thousand volts or greater, electrons will be liberated from the filament at a rate above the saturation point so that the resulting action is that each electron so liberated is caused to pass from the filament 15 and strike against the target 23. The energy of impact of such electrons upon this target operates to heat the same to a temperature depending upon the voltage through which said electrons have fallen. The energy so produced is measured by means of a millivolt meter 26. It will be apparent that lines 19 and 20 form a thermo-couple having a hot junction at the point 22 and a cold junction at the meeting between wire 20 and wire 25. Electrons received upon the target 23 pass through line 21 to low junction lead 7 and are measured by the milli-ammeter 28.

Thus there is obtained a reading of the voltmeter 26 and the milli-ammeter 28, the readings of the millivolt meter 26 being in proportion to the energy passing through the instrument and the reading of the milli-ammeter 28 being in accordance with the current therethrough. A division of the readings of instrument 26 by those of instrument 28 will give results in proportion to the actual voltage across leads 6 and 7.

In practice the instrument may be calibrated by use across lines of known potential difference or of such low potential difference as can be measured by ordinary instruments such as E. M. F.'s below three thousand volts, and thereafter employed to give direct readings on higher voltages. To eliminate the necessity of arithmetical calculation from two different instruments, the instrument may be calibrated at various voltages.

In calibrating the instrument the rheostat 17 may be adjusted at each different impressed voltage to bring one or the other of the indicating devices 26 and 28 to the same figure for a number of different voltages which will then permit the other instrument to directly indicate the voltage and be so calibrated. Thereafter in use on an unknown voltage, the rheostat 17 should be adjusted to return either the instrument 26 or 28 to its standard position and then the opposed instrument will directly indicate the unknown voltage without the necessity of calculations.

In operation, in measuring direct current voltages, the instrument should be so used that the line 6 is the high voltage line and the line 7 the low voltage line. The instrument may also be employed to measure voltages of alternating current in which the instrument indicates not the mean average voltage as generally indicated by alternating volt meters but indicates one half the average voltage.

It will be understood that various modifications may be made in the device, the milliammeter 28 may be placed in various positions and various means may be employed for measuring the energy of impact of the electrons liberated in the vessel 2. One of such modifications is indicated in the form of the invention shown in Fig. 2. The parts in Fig. 2 similar to those in Fig. 1 are not described, it being thought necessary only to describe wherein modifications exist. The general construction of the vessel 2 and filament light circuit is similar, but in place of employing a thermo-couple for measuring the energy and impact of electrons liberated from filament 15, a resistance 29 is disposed within the ball shape portion 3 of the vessel so that electrons from the filament 15 will strike thereagainst, said resistance being connected by lines 30 and 31 to an instrument generally indicated by 32, adapted to indicate the energy of impact by measuring the change in resistance of wire 29.

In the drawings, such instrument is indicated as comprising the general form of a Wheatstone bridge, 33 indicating the galvanometer thereof.

The instrument of Fig. 2 can be employed in the obvious manner for measuring the energy impact on the resistance 29 and such measurement can be employed in the same manner as the measurement obtained from the milliammeter 26 from the previous embodiment for disclosing the potential difference across leads 6 and 7.

Neither of the forms of the invention herein described will affect the capacity or inductance of the high potential line voltage which is to be measured, and it is found that the voltage thereof may be measured with extreme accuracy by the instrument, measurements within one-half per cent being readily obtained. The instrument is economical in construction and small in size, and positive in operation.

While the embodiments of the invention herein described are well suited to accomplish the purposes of this invention, it is not intended to limit the invention to the specification modifications disclosed, but various modifications may be made within the spirit of the appended claims.

I claim:

1. A method of measuring the electric potential difference between two points, which includes creating a thermionic discharge of electrons through an evacuated zone from a point of one electric potential to a point of different electric potential, the rate of flow being maintained above the saturation point of such zone, measuring the rate of flow of said electrons, and measuring the energy of impact of such flow of electrons.

2. A method of measuring the electric potential difference between two points, which includes creating a flow of electrons through an evacuated zone from a point of one electric potential to a point of different electric potential, the rate of flow being maintained above the saturation point of such zone, and employing the resultant energy of impact to determine the difference in potential by measuring such energy and rate of flow of such electrons, either the energy or rate of flow being brought to a standard to permit the other measurement to directly disclose the difference in potential.

3. A voltmeter comprising an evacuated vessel, means including a filament within the vessel for liberation of electrons, a member in the vessel for receiving the impact of such electrons, means for indicating the energy of impact, and means for indicating the rate of flow of such electrons.

4. A voltmeter comprising an evacuated vessel, means including a filament within the vessel for liberation of electrons, a member in the vessel for receiving the impact of such electrons, means for indicating the energy of impact, means for indicating the rate of flow of such electrons, leads connected with said electron liberating means and said member, and extensions of said vessel enclosing said leads throughout substantial distances.

5. A voltmeter comprising an evacuated vessel, means including a filament within the vessel for the liberation of electrons, a target in the vessel against which the electrons may impact, means for indicating the energy of impact, and means for indicating the rate of flow of such electrons, the vessel having elongated, insulated, terminal supports integrally united therewith.

Signed at Pasadena, California, this 29th day of December, 1924.

WILLIAM R. SMYTHE.